United States Patent
Ferguson et al.

(10) Patent No.: US 12,292,237 B2
(45) Date of Patent: May 6, 2025

(54) METALLURGICAL FURNACE HAVING AN INTEGRATED OFF-GAS HOOD

(71) Applicant: Systems Spray-Cooled, Inc., Smyrna, TN (US)

(72) Inventors: Scott A. Ferguson, Murfreesboro, TN (US); Troy D. Ward, Franklin, TN (US)

(73) Assignee: Systems Spray-Cooled, Inc., Smyrna, TN (US)

( * ) Notice: Subject to any disclaimer, the term of this patent is extended or adjusted under 35 U.S.C. 154(b) by 0 days.

(21) Appl. No.: 18/381,612

(22) Filed: Oct. 18, 2023

(65) Prior Publication Data

US 2024/0044580 A1  Feb. 8, 2024

Related U.S. Application Data

(60) Division of application No. 17/513,385, filed on Oct. 28, 2021, now Pat. No. 11,815,313, which is a continuation of application No. 16/419,670, filed on May 22, 2019, now Pat. No. 11,187,462.

(60) Provisional application No. 62/699,537, filed on Jul. 17, 2018.

(51) Int. Cl.
F27D 17/00 (2006.01)
C21C 5/38 (2006.01)

(52) U.S. Cl.
CPC .............. *F27D 17/002* (2013.01); *C21C 5/38* (2013.01)

(58) Field of Classification Search
CPC . F27D 17/002; F27D 1/02; F27D 1/12; F27D 1/1816; C21C 5/38; C21C 7/0075
USPC .......... 266/44, 46, 158, 241; 373/73, 74, 75, 373/113, 165; 432/233
See application file for complete search history.

(56) References Cited

U.S. PATENT DOCUMENTS

| | | | |
|---|---|---|---|
| 3,415,179 | A | 12/1968 | Scheel |
| 4,063,028 | A | 12/1977 | Longenecker |
| 4,715,042 | A | 12/1987 | Heggart et al. |
| 4,815,096 | A | 3/1989 | Burwell |
| 4,849,987 | A | 7/1989 | Miner, Jr. et al. |

(Continued)

FOREIGN PATENT DOCUMENTS

| | | |
|---|---|---|
| EP | 1112467 A1 | 7/2001 |
| EP | 2693144 A1 | 2/2014 |
| EP | 2693145 A1 | 2/2014 |
| JP | H08035779 A | 2/1996 |
| JP | 3162619 B2 | 5/2001 |

(Continued)

OTHER PUBLICATIONS

International Search Report and Written Opinion for PCT/US2019/033532 dated Augsut 29, 2019.

(Continued)

*Primary Examiner* — Jessee R Roe
*Assistant Examiner* — Michael Aboagye
(74) *Attorney, Agent, or Firm* — Patterson + Sheridan, LLP

(57) ABSTRACT

A method for venting a spray-cooled roof of a ladle metallurgical furnace is provided herein. The method begins by processing molten metal materials in a ladle metallurgical furnace having a spray-cooled roof with an opening configured for one or more electrodes to pass there through and an integrated hood. Process gases and fumes are extracted through a channel having walls disposed within an enclosed space of the spray-cooled roof. The walls of the channel are cooled with a spray-cool system extends between the walls of the channel and a top of the spray-cooled roof.

14 Claims, 4 Drawing Sheets

(56) References Cited

U.S. PATENT DOCUMENTS

| | | | |
|---|---|---|---|
| 5,115,184 A | | 5/1992 | Arthur et al. |
| 5,290,016 A | | 3/1994 | Elsner |
| 5,601,427 A | * | 2/1997 | Yuasa ................... F23G 5/48 |
| | | | 432/233 |
| 5,648,981 A | | 7/1997 | Miner, Jr. et al. |
| 5,943,360 A | | 8/1999 | Haissig |
| 5,999,558 A | | 12/1999 | Miner, Jr. et al. |
| 8,268,231 B2 | * | 9/2012 | Tsutsumi ............... F27D 17/00 |
| | | | 266/147 |
| 9,310,133 B2 | * | 4/2016 | Mizutani ................ C21C 5/40 |
| 11,815,313 B2 | * | 11/2023 | Ferguson ............... C21C 5/38 |
| 2008/0128962 A1 | | 6/2008 | Arthur et al. |
| 2012/0193844 A1 | | 8/2012 | Carraway |

FOREIGN PATENT DOCUMENTS

| | | |
|---|---|---|
| KR | 20120119026 A | 10/2012 |
| KR | 102187418 B1 | 12/2020 |

OTHER PUBLICATIONS

Extended European Search Report for European Patent Application No. 19837360.7 dated Mar. 18, 2022.

Exaxmination Report from Australian Patent Application No. 2019306427 dated Jul. 8, 2024.

Office Action from Mexican Patent Application No. MX/a/2020/010939 dated Jan. 20, 2025, with translation.

* cited by examiner

METALLURGICAL FURNACE HAVING AN INTEGRATED OFF-GAS HOOD

RELATED APPLICATIONS

This application is a divisional of U.S. patent application Ser. No. 17/513,385, filed Oct. 28, 2021, now U.S. Pat. No. 11,815,313, which is a continuation of U.S. patent application Ser. No. 16/419,670 filed May 22, 2019, now U.S. Pat. No. 11,187,462, which claims the benefit of U.S. Provisional Application No. 62/699,537, filed Jul. 17, 2018, the contents of which are incorporated herein in their entireties.

BACKGROUND OF THE DISCLOSURE

Field of the Disclosure

Embodiments of the present disclosure relates generally to a ladle metallurgical furnace, particularly a ladle metallurgical furnace having an integrated off-gas hood.

Description of the Related Art

Ladle metallurgical furnaces (LMF's) are used in the processing of molten metal materials. LMF's are an intermediate steel processing unit that further refines the chemistry and temperature of molten steel while it is still in the ladle. The ladle metallurgy step comes after the steel is melted and refined in the electric arc or basic oxygen furnace, but before the steel is sent to the continuous caster. The carrying out of metallurgical reactions in the ladle is a common practice in most steelmaking shops as it is cost-efficient to operate the primary furnace as a high-speed melter and to adjust the final chemical composition and temperature of the steel after tapping in the LMF.

The simplest form of steel treatment in the ladle takes place when the mixing effect of the tapping stream is used to add deoxidizers, slag formers, and small amounts of alloying agents. These materials are either placed into the ladle before tapping or are injected into the tapping stream. Control over steel temperature can be achieved in a LMF with electrodes for arc heating with the ladle acting as the furnace shell. Argon gas and/or electromagnetic stirring is applied for better heat transfer. Most LMFs can raise the temperature of the steel by 4° C. per minute to 6° C. per minute by inducing a strong exothermic chemical reaction (for instance, by feeding aluminum and injecting oxygen) at the stirring station.

Injecting calcium-silicon or magnesium-lime into the steel is used to remove sulfur and dissolved oxygen. Exposing steel to vacuum conditions has a profound effect on all metallurgical reactions involving gases. First, it lowers the level of gases dissolved in liquid steel. Hydrogen or nitrogen, for example, is readily removed in a vacuum. In theory, oxygen and carbon, when dissolved in steel, react to form carbon monoxide. Argon is also blown in during this end phase for better mixing and removal of hydrogen and nitrogen. However, with the introduction of all these agents, the LMF off-gases large quantities of gases and fumes that needs to be captured and removed.

Emissions are typically evacuated through a vacuum pumping system and collected prior to the pumps or they are discharged under water contained within a weir wall-equipped hotwell. The process gases, including those entrained in the intercondenser discharge water, are exhausted from the hotwell via a motor driven fan to a vent stack equipped with a flare burner. However, the complexity and efficiency of the vacuum pumping system with the LMF is both costly and cumbersome.

Therefore, there is a need for an improved off-gas evacuation system for the metallurgical furnaces.

SUMMARY

A method for venting a spray-cooled roof of a ladle metallurgical furnace is provided herein. The method begins by processing molten metal materials in a ladle metallurgical furnace having a spray-cooled roof with an opening configured for one or more electrodes to pass there through and an integrated hood. Process gases and fumes are extracted through a channel having walls disposed within an enclosed space of the spray-cooled roof. The walls of the channel are cooled with a spray-cool system extends between the walls of the channel and a top of the spray-cooled roof.

BRIEF DESCRIPTION OF THE DRAWINGS

So that the way the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

The present invention is directed to an electric arc metallurgical furnace, or other furnace such as a ladle metallurgical furnace (LMF), configured with a spray-cooled roof having an integrated off-gas hood. The LMF has a plurality of electrodes which enter the furnace through an opening in the roof and heat or melt the material in the LMF. The spray-cooled roof is subject to temperatures suitable for melting metal materials. The off-gas hood integrated into the spray-cooled roof is configured to remove gases and fumes escaping the LMF. The integrated off-gas hood draws from the opening disposed in the spray-cooled roof. The opening is utilized by the electrodes to access molten material in an interior volume of the LMF. The spray-cooled roof has a top which may be flat to provide safe access to the roof section. A coolant supply header provided in the roof section for cooling the roof is additionally configured to cool the integrated off-gas hood. The spray-cool system additionally operates to cool the gases and fumes evacuated from the furnace through the integrated off-gas hood.

Figure 1:
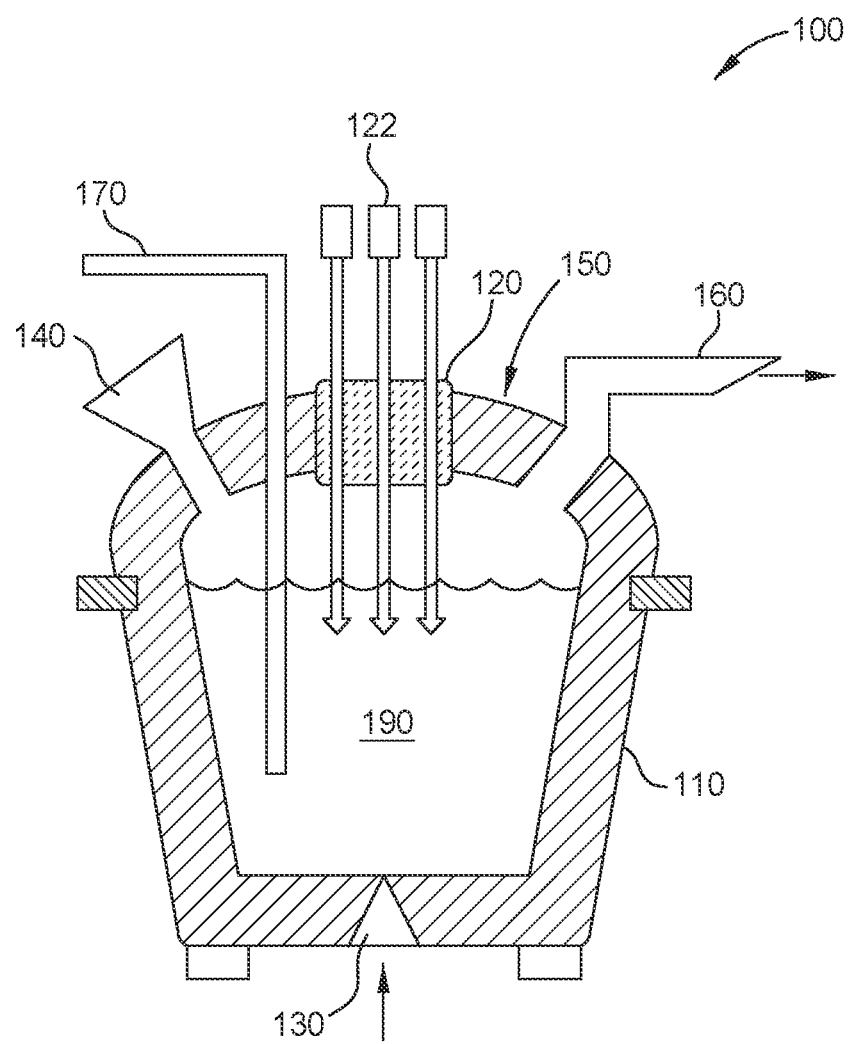
FIG. 1 illustrates a side view of a ladle metallurgical furnace having a conventional roof disposed thereon.

FIG. 1 illustrates a side view of a ladle metallurgical furnace (LMF) 100 having a conventional roof 150 disposed thereon. The LMF 100 is suitable for melting scrap and other metals therein and may have temperatures exceeding 1000° Celsius, such as temperatures of about 1250° Celsius. The LMF 100 may utilize a spray-cool system, or other cooling system, to protect itself from these elevated temperatures so as to avoid damage such as structural melting, compromise of seals or valves and/or exceeding the yield strength for structural components. The LMF 100 may be disposed on rails or other transport mechanism to move the LMF 100 from one location to another. For example, the LMF 100 may be moved along the rails to provide the molten material therein to a secondary operation location, such as a casting operation.

The LMF 100 has a body 110. The body 110 is configured to support the conventional roof 150 moveably disposed thereon. An interior volume 190 of the LMF 100 is enclosed by a conventional roof 150 and the body 110. The interior volume 190 may be loaded or charged with material, e.g., metal, scrap metal, or other meltable material, which is to be melted within the LMF 100.

A port 130 extends through the body 110 into the interior volume 190. The port 130 is configured to inject a fluid, such as argon gas, into the molten material disposed in the interior volume 190 of the LMF 100.

The conventional roof 150 may be circular in shape when viewed from a top plan view. The conventional roof may have one or more of a hopper 140, a powder injection lance 170 and a central opening 120. The hopper 140 is configured to supply additives to the material in the interior volume 150. The powder injection lance 170 is similarly configured to supply additives to the material in the interior volume 150.

The central opening 120 may be formed through the spray-cooled roof 150. Electrodes 122 extend through the central opening 120 from a position above the conventional roof 150 into the interior volume 190. During operation of the LMF 100, the electrodes 122 are lowered through the central opening 120 into the interior volume 190 of the LMF 100 to provide electric arc-generated heat to melt the material.

The conventional roof 150 may further include an exhaust port 160 to permit removal of fumes generated within the interior volume 190 of the LMF 100 during operation. Conventionally, the exhaust port 160 extends into the interior volume 190 for venting gases and fumes therein.

Figure 2:
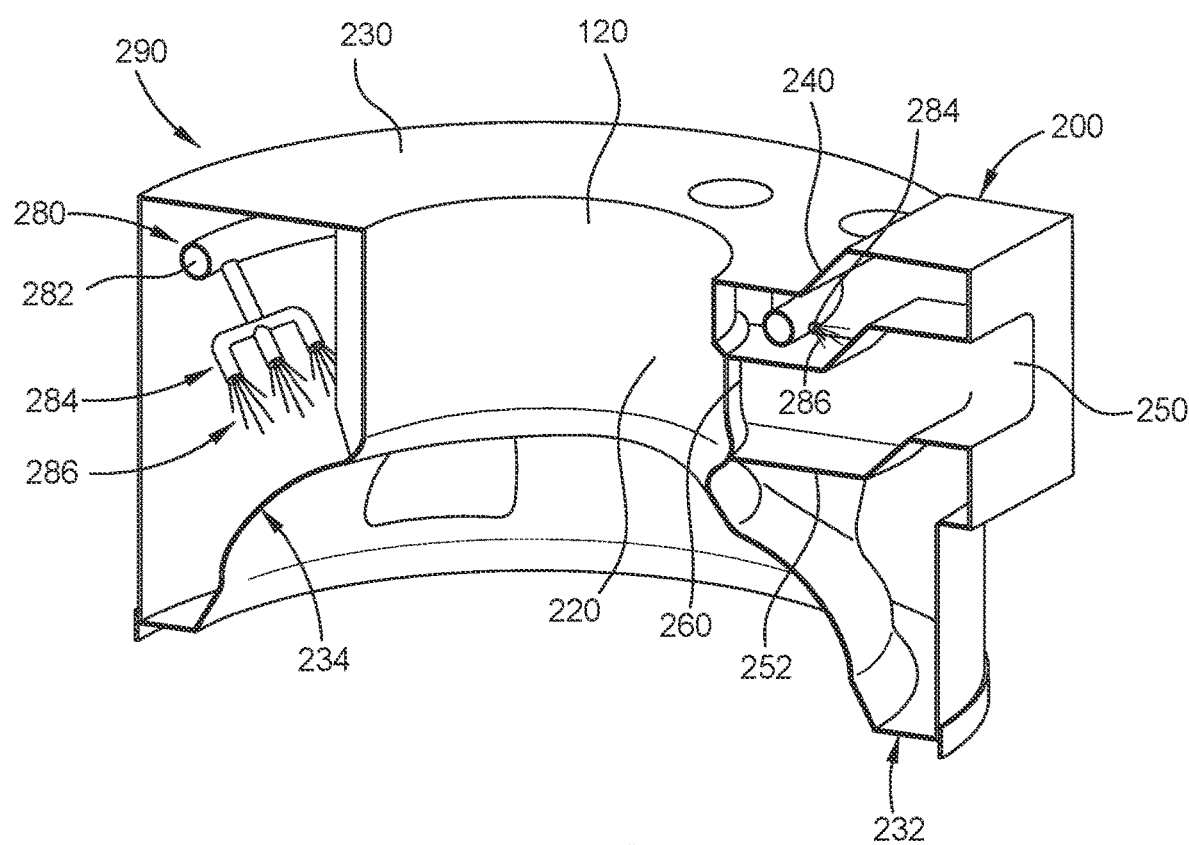
FIG. 2 illustrates a cross section for a spray-cooled roof having an integrated off-gas hood suitable for the ladle metallurgical furnace of FIG. 1.

FIG. 2 illustrates a cross section for a spray-cooled roof 290 having an integrated off-gas hood 200 suitable for use on the ladle metallurgical furnace 100 of FIG. 1. The spray-cooled roof 290 has a top surface 230 and a bottom surface 234. The flat top surface 230 may be flat to support one or more persons thereon. Thus, maintenance can be made easier and safer on the flat top surface 230 of the spray-cooled roof 290.

The spray-cooled roof 290 has an opening 120 configured to allow electrodes to extend therethrough and heat the material in the LMF 100. The opening 120 has a sidewall 220 extending from the top surface 230 to the bottom surface 234. The sidewall 220, top surface 230 and a bottom surface 234 surrounds an enclosed space 240 of the spray-cooled roof 290.

The spray-cooled roof 290 has a spray-cooling system 280 inside the enclosed space 240. The spray-cooled system 280 has a header 282 and a plurality of spray nozzles 284. The header 282 provides a coolant 286 to the spray nozzles 234 for spraying the coolant on the interior surfaces of the spray-cooled roof 290, such as the sidewall 220 and bottom surface 234.

The integrated hood 200 has an outlet 250 and an inlet 260 disposed on the sidewall 220 of the opening 120. A channel 252 fluidly couples the inlet 260 to the outlet 250. The channel 252 may have a step or jog therein such that the inlet 260 is vertically further from a plane of the top surface 230 than the outlet 250. In this manner, the top surface 230 may be made flat at or near the opening 120. The inlet 260 is configured to capture, or draw, gases and fumes rising through the opening 120 and pull the gases and fumes into the channel 252 of the integrated hood 200. The inlet 260 prevents the gases and fumes from escaping through the opening 120 in the spray-cooled roof 290. The gases and fumes entering into the channel 252 of the integrated hood 200 are plumbed through the outlet 250 to a recovery system. The inlet 260 location on the sidewall 220 provides better extraction efficiency as the gases and fumes which are naturally directed to the opening 120 where the integrated hood 200 is configured to draw the gases from. This in turn prevents off-gas leaks and ambient air penetration which would otherwise occur through the opening 120.

One or more of the nozzles 234 may be inside the integrated hood 200 or aligned to spray coolant 286 on the channel 252. The spray-cooled system 280 is thus configured to cool the integrated hood 200 and in particular the channel 252. Cooling the channel 252 has the additional benefit of further cooling the gases recovered by the integrated hood 200 prior to exiting the outlet 250.

Figure 3:
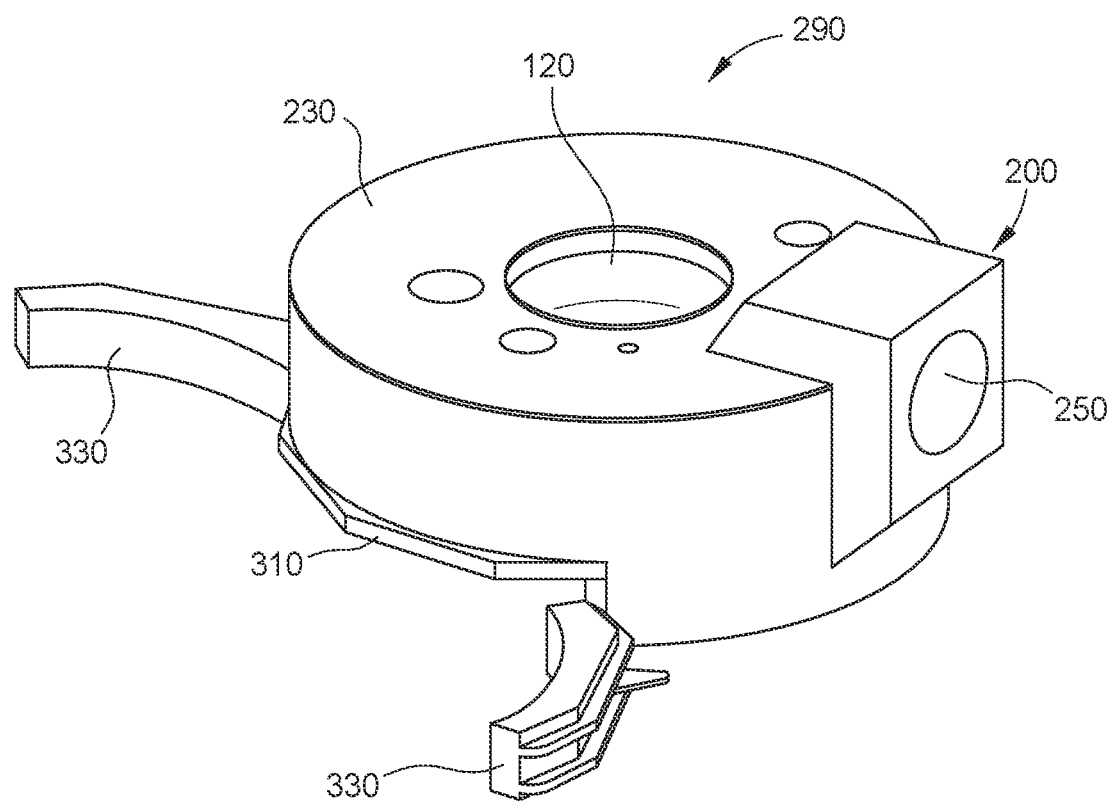
FIG. 3 illustrates a top perspective view for the spray-cooled roof of FIG. 2.
Figure 4:
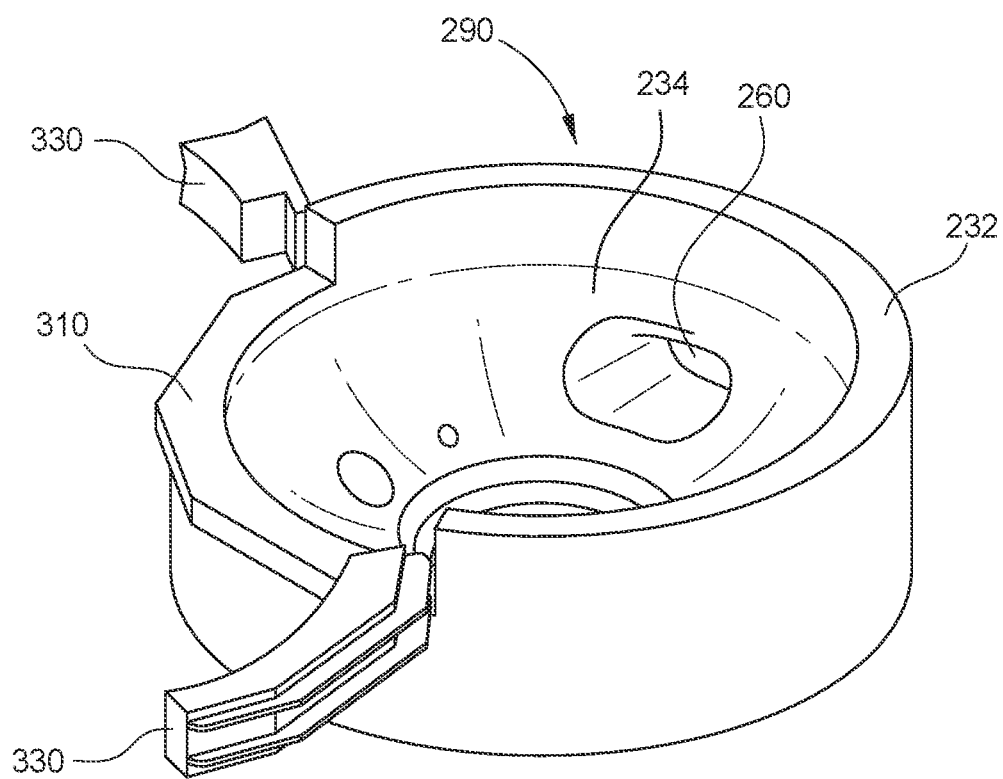
FIG. 4 illustrates a bottom perspective view for the spray-cooled roof of FIG. 2.

FIGS. 3 and 4 will be discussed together here. FIG. 3 illustrates a top perspective view for the spray-cooled roof 290 of FIG. 2. FIG. 4 illustrates a bottom perspective view for the spray-cooled roof 290 of FIG. 2. The spray-cooled roof 290 has doors 330. The doors 330 are operable between an open position and a closed position. In the closed position, the doors 330 provide a seal between the body 110 of the LMF 100 and the spray-cooled roof 290. In the open position, the doors 330 expose an opening 310. The opening 310 provides access to the interior volume 190 of the LMF 100. Additionally, when the doors 330 are in the open position, the LMF 100 may be moved from the spray-cooled roof 290 without lifting/raising the spray-cooled roof 290.

Advantageously, the LMF roof with the integral off-gas hood has more efficient cooling, eliminates off-gas leaks and ambient air infiltration, reduces fabrication costs of the roof of the off-gas collection system, and provides a safer level surface to work on. In the embodiments disclosed above, the LMF roof with the integral off-gas hood is additionally configured with doors allowing the ladle to move in/out without raising the roof.

While the foregoing is directed to embodiments of the present disclosure, other and further embodiments may be devised without departing from the basic scope thereof, and the scope thereof is determined by the claims that follow.

What is claimed is:

1. A method for venting a spray-cooled roof of a ladle metallurgical furnace having an integrated hood: processing molten metal materials in a ladle metallurgical furnace; the spray-cooled roof comprising a central opening having sidewalls defining the opening, the opening configured for one or more electrodes to pass there through; extracting process gases and fumes in the opening through a channel having an inlet formed in the sidewalls of the opening, wherein the channel has walls disposed within an enclosed space of the spray-cooled roof; and cooling the walls of the channel with a spray-cool system that extends between the walls of the channel and a top of the spray-cooled roof.

2. The method of claim 1 wherein the channel fluidly couples an inlet to an outlet disposed on an outer wall of the spray-cooled roof.

3. The method of claim 2 wherein the channel has a step therein such that the inlet is vertically further from a plane of the top of the spray-cooled roof than the outlet.

4. The method of claim 2 wherein one or more nozzles of the spray-cool system is configured to spray fluid directly on the walls of the channel.

5. The method of claim 1, wherein extracting process gases comprises:
capturing fumes rising through the opening into the channel.

6. The method of claim 5 wherein fumes are substantially prevented from escaping through the opening to an environment outside the ladle metallurgical furnace.

7. The method of claim 5 further comprising:
recovering the fumes entering into the channel with a recovery system coupled to the channel outside the ladle metallurgical furnace.

8. The method of claim 5 further comprising:
drawing ambient air penetrating through the opening into the channel and preventing the ambient air from entering into the ladle metallurgical furnace.

9. A method for cooling a channel for venting fumes in a spray-cooled roof of a ladle metallurgical furnace, the spray-cooled roof comprising a central opening having sidewalls defining the opening, the opening configured for one or more electrodes to pass there through the method comprising; extracting process gases and fumes in the opening through a channel having an inlet formed in the sidewalls of the opening; wherein the channel has walls disposed within an enclosed space of the spray-cooled roof; and cooling the walls of the channel with a spray-cool system that extends between the walls of the channel and a top of the spray-cooled roof.

10. The method of claim 9 wherein the channel is disposed within the spray-cooled roof and the channel is fluidly coupled an inlet to an outlet disposed on an outer wall of the spray-cooled roof.

11. The method of claim 10 wherein the channel has a step therein such that the inlet is vertically further from a plane of a top surface of the spray-cooled roof than the outlet.

12. The method of claim 11 wherein one or more nozzles of the spray-cool system is configured to spray fluid directly on outer walls of the channel.

13. The method of claim 12 wherein the one or more nozzles of the spray-cool system sprays cooling fluid at a location wherein the channel is coupled to the opening.

14. The method of claim 13 wherein extracting process gases comprises:
capturing fumes rising through the opening into the channel, wherein heat from the fumes are transferred to the cooling fluid sprayed onto the channel.

* * * * *